Patented July 21, 1942

2,290,675

UNITED STATES PATENT OFFICE 2,290,675

CONDENSATION PRODUCT OF AN ALIPHATIC ALDEHYDE AND AN UNSATURATED AMIDE

Gaetano F. D'Alelio, Pittsfield, Mass., assignor to General Electric Company, a corporation of New York No Drawing. Application August 10, 1939, Serial No. 289,435

16 Claims. (Cl. 260—72)

This invention relates to new condensation products and is a continuation-in-part of my copending application Serial No. 169,465, filed October 16, 1937, now Patent No. 2,239,440, issued April 22, 1941, and assigned to the same assignee as the present invention.

In my above-identified copending application I disclosed and claimed resinous compositions prepared by reacting an aliphatic aldehyde, specifically formaldehyde, with an organic compound having the general structure

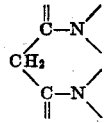

more particularly compounds such as malonic diamide, methylene cyanide, cyanoacetamide, etc. During the reaction methylol and methylene derivatives are formed as intermediate products. For example, when malonic diamide is reacted with formaldehyde, an intermediate compound of the structure

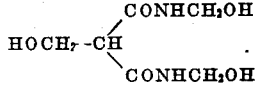

is obtained. When dehydrated, this intermediate compound yields

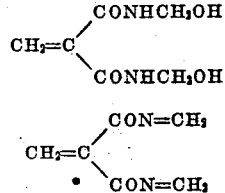

and

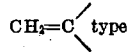

These latter compounds may be classed generally as methylol and methylene derivatives, respectively, of a

of unsaturated polycarboxylic amide: Likewise I showed that these methylol and methylene derivatives not only were resin-forming in themselves but that certain advantages accrued when they were intercondensed with other bodies, for example phenols and formaldehyde.

In practising the invention described in my above application, the methylol and methylene derivatives of the

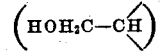

containing type of unsaturated polycarboxylic acid amides were prepared in situ by dehydrating the carbon-methylol $$\left(HOH_2C-C\overset{\diagup}{\underset{\diagdown}{H}}\right)$$

reaction product of, for example, formaldehyde and malonic diamide. By this method it was difficult properly to dehydrate the methylol derivative and to obtain a completely dehydrated product. Further, the resins produced in this way had limited applications.

I have now discovered that by starting with a polyamide already containing a methylene, rather than a methylol, grouping attached to a carbon atom, the above difficulties can be obviated and products having a wider variety of service applications can be obtained.

More particularly, I have found that new and useful condensation products can be obtained by condensing an aliphatic aldehyde, for example formaldehyde, with an amide of an unsaturated polycarboxylic acid containing a

grouping and in which the carboxylic groups are attached to different carbon atoms. Examples of such amides are itaconic diamide,

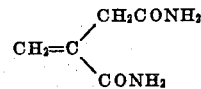

methyl itaconic diamide

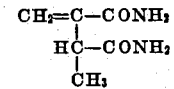

beta methylene glutaric diamide,

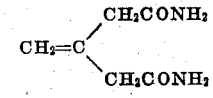

etc. For purposes of brevity in describing the invention, such amides are hereafter collectively described as "vinyl polyamides."

Particularly valuable resinous compositions are obtained by intercondensing an aliphatic aldehyde and a vinyl polyamide with at least one other aliphatic aldehyde-reactable organic compound capable of forming a methylol derivative as an intermediate during the resin formation, for example, urea, phenols, acetone, etc.

In carrying the present invention into effect the condensation between the reactants may be carried out under acid, alkaline or neutral conditions and at normal or elevated temperatures. Any substance which has an acid or alkaline nature may be used to obtain the acid, alkaline, or neutral condition, as for example, ammonia, sodium hydroxide, calcium hydroxide, methyl amine, diethyl amine, triisopropyl amine, ethanol amine, triisopropanol amine, etc.; mixtures of such alkaline substances; inorganic or organic acids such as hydrochloric, sulfuric, phosphoric, acetic, acrylic, crotonic, malonic, etc.; mixtures of such acids; acid salts such as sodium acid sulfate, monosodium phosphate, monosodium phthalate, etc.; basic salts such as ammonium carbonate, potassium carbonate, sodium acetate, etc.; or mixtures of such salts.

I may condense the components used in practising this invention under various conditions. For example, all the components may be mixed together and the reaction caused to proceed under acid, alkaline or neutral conditions. Or, I may effect partial condensation between an aliphatic aldehyde and at least one methylol-forming organic compound, and then add a vinyl polyamide and effect further condensation. Or, I may first partially condense a vinyl polyamide with an aliphatic aldehyde under acid, alkaline or neutral conditions and then add at least one methylol-forming organic compound and effect further condensation. Also, I may separately partially condense a methylol-forming organic compound and a vinyl polyamide with an aliphatic aldehyde and then mix the two products of partial condensation and effect further condensation. Both syrups may be initially condensed under acid, alkaline, or neutral conditions.

Still other ways may be employed in combining the components and in producing the unmodified or modified condensation products of this invention, as will be readily understood by those skilled in the art as the description of the invention proceeds. These condensation reactions may proceed under a wide variety of time, pressure, and temperature conditions. The temperature of reaction may vary from room temperature to the reflux temperture of the reactants at reduced, atmospheric or superatmospheric pressures.

The products obtained as described above properly may be designated as intermediate condensation products which, alone or mixed with fillers, pigments, dyes, lubricants, etc., may be used, for example, as molding compositions. The modified or unmodified resinous masses may be converted, by means such as hereafter set forth, to the insoluble infusible state. Depending upon the particular reactants employed and the particular conditions of reaction, these intermediate condensation products vary from clear, colorless, syrupy, water-soluble liquids to viscous, milky dispersions and gel-like masses of decreased solubility in ordinary solvents such as alcohol, glycol, glycerine, water, etc. The liquid intermediate condensation products may be concentrated or diluted further by the removal or addition of volatile solvents to form liquid coating compositions of adjusted viscosity and concentration. These liquid compositions may be used, for instance, as surface coating materials, in the production of paints, varnishes, lacquers, enamels, etc., for general adhesive applications, such as anticreasing agents, in producing laminated articles, and for numerous other purposes. The liquid intermediate products may be dehydrated and used as casting resins. Also, these products may be dried and granulated to form clear, unfilled, heat-convertible resins.

In order that those skilled in the art better may understand how this invention may be carried into effect, the following examples are given by way of illustration. All parts are by weight.

Example 1

| | Parts |
|---|---|
| Itaconic diamide | 127.0 |
| Aqueous formaldehyde (37.1%) | 161.0 |
| Sodium hydroxide (in 10 parts water) | 1.27 |

The above components were refluxed for from one-half to one hour, resulting in a clear, water-white resinous solution. The resin isolated by dehydration of the aqueous resin solution was a soluble, fusible mass at 150° C. The addition of acid bodies (direct-curing catalysts), for example phthalic acid, hydrochloric acid, etc., accelerated the conversion of the resinous mass to the insoluble infusible state under heat or under heat and pressure. The cured product was a hard, clear, water-white resin.

Example 2

| | Parts |
|---|---|
| Itaconic diamide | 127.0 |
| Aqueous formaldehyde (37.1%) | 161.0 |
| Hydrochloric acid—35% (in 10 parts water) | 2.5 |

The process of preparation was substantially the same as given under Example 1. The resulting resin was convertible under heat or under heat and pressure to the insoluble infusible state, yielding resinous bodies of the same general characteristics as the product of Example 1.

In the above examples 2 moles of aliphatic aldehyde, specifically formaldehyde, were used for each mole of vinyl polyamide, specifically itaconic diamide. However, various other mole ratios of reactants may be employed, for example from ¾ to 6 moles aliphatic aldehyde for each mole vinyl polyamide. Preferably, I use from approximately 1½ to 3 moles aliphatic aldehyde per mole vinyl polyamide.

The following examples relate particularly to the production of condensation products of an aliphatic aldehyde, a vinyl polyamide and a methylol-forming organic compound. In preparing such condensation products the ratio of total vinyl polyamide and methylol-forming organic compound to aliphatic aldehyde may be varied, for instance as described above with reference to the mole ratios of aliphatic aldehyde to vinyl polyamide alone. Mainly because of the present higher cost of the vinyl polyamides, I prefer to use not exceeding substantially ½ mole vinyl polyamide for each mole of the methylol-forming organic compound.

Example 3

| | Parts |
|---|---|
| Phenol (redistilled) | 94.0 |
| Aqueous formaldehyde (37.1%) | 164.0 |
| Sodium hydroxide (in 10 parts water) | 0.47 |
| Itaconic diamide | 9.4 |

All of the above components with the exception of the itaconic diamide were mixed and refluxed for 45 minutes. The itaconic diamide was added and the mass was further refluxed for 5 minutes. The syrup was compounded with 50 parts alpha flock and 0.2 part zinc stearate to form a molding composition. The compound was dried at 70° C. Molded articles formed from the dried compound, under heat and pressure, were well cured and of good color.

*Example 4*

Same formula was used as in Example 3. The syrup was prepared in exactly the same way, except that after the itaconic diamide had been added and the mass heated under reflux for 50 minutes the syrup was acidified with a slight excess of citric acid. The resulting syrup was compounded with 50 parts alpha flock and 0.2 part zinc stearate to form a molding composition. The component was dried at 50° C. and molded under heat and pressure, yielding very light-colored molded articles.

*Example 5*

| | Parts |
|---|---|
| Phenol | 94.0 |
| Aqueous formaldehyde (37.1%) | 242.0 |
| Sodium hydroxide (in 15 parts water) | 0.68 |
| Itaconic diamide | 128.0 |

The above components, with the exception of the itaconic diamide, were mixed and refluxed for 45 minutes. The itaconic diamide was added and the mass further refluxed for 3 minutes. The resulting syrup was made slightly acid with citric acid. The acidified syrup was compounded with alpha flock and zinc stearate to form a molding compound. The compound was dried at 70° C. and molded under heat and pressure to form molded articles of very light color. The shaped articles, when hot, are sufficiently elastic that they may be sprung readily from a threaded die.

*Example 6*

| | Parts |
|---|---|
| Phenol | 94.0 |
| Aqueous formaldehyde (37.1%) | 161.0 |
| Sodium hydroxide (in 12 parts water) | 0.47 |
| Itaconic diamide | 9.4 |

The above components, with the exception of the itaconic diamide, were mixed and heated under reflux for 40 minutes. The itaconic diamide was added and the solution again heated under reflux to effect further condensation. One (1) part citric acid in about 5 parts water was added to the syrup to neutralize the sodium hydroxide and make the mass slightly acid. The syrup was dehydrated to an internal temperature of about 80° C. at 26 inches vacuum. The dehydrated resin was poured into cylindrical molds and heated at 80° C. for 20 to 200 hours. The well-cured resin was of a very light pink color.

*Example 7*

Same formula was used as in Example 6. The phenol and formaldehyde were mixed and heated under reflux with sodium hydroxide as catalyst for 90 minutes. The itaconic diamide was added and the mixture again heated under reflux for 10 minutes. The syrup was made slightly acid with sulfuric acid and dehydrated under vacuum. The resin was cast into cylindrical molds and cured at 80° C. The castings so obtained were opaque and a very light orange in color.

*Example 8*

Same formulation as in Example 6. The alkaline syrup was prepared in exactly the same way as in Example 7, but in this example the syrup was neutralized with lactic acid. The syrup was dehydrated under vacuum. The resin was poured into cylindrical molds and cured at 80° C. The resulting castings were very light in color and very translucent.

*Example 9*

Same as Example 7 with the exception that the alkaline resin syrup was acidified with a slight excess of citric acid. Paper sheets to be laminated were dipped in the acidified syrup and dried at 80° C. The dried sheets were superimposed and the resulting laminated material was heated at 130° C. under a pressure of 1150 pounds per square inch. This temperature was maintained for 20 minutes, thereafter being reduced to room temperature. The finished laminated article was of light color and exceptionally translucent. The laminations were firmly bonded together.

*Example 10*

| | Parts |
|---|---|
| Phenol | 10.0 |
| Aqueous formaldehyde (37.1%) | 30.0 |
| Itaconic diamide | 5.0 |
| Hydrochloric acid—35% (in 5 parts water) | 0.175 |

The above components were mixed and heated under reflux for 1 hour. At the end of this time a white resin had precipitated out of the solution. The resin became transparent on dehydration, and when heated at 150° C. was converted to an insoluble, infusible mass.

*Example 11*

| | Parts |
|---|---|
| Urea | 54.0 |
| Aqueous formaldehyde (37%) | 161.0 |
| Itaconic diamide | 12.8 |
| Sodium hydroxide (in 5 parts water) | 0.2 |
| Phthalic anhydride | 3.0 |

All of the components with the exception of the phthalic anhydride were mixed and refluxed for 30 minutes. The product of partial condensation was compounded with 64 parts alpha flock and 0.4 part zinc stearate. The compound was dried at 50° C., after which the phthalic anhydride was added in the form of an alcoholic solution. The alcohol-moist compound was dried at 50° C. The dried compound, when heat- and pressure-hardened at 130° C. and at pressures of 2000 to 3000 pounds per square inch, gave cured and molded articles of good appearance. The compound had good flow.

*Example 12*

Same formula as Example 11 except that 0.3 part chloroacetamide was used in place of phthalic anhydride. All of the components with the exception of the chloroacetamide were mixed and heated under reflux for 30 minutes. The chloroacetamide was next added and intercondensed with the partial condensation product by heating under reflux for 10 minutes. To the hot syrup was added 64 parts alpha flock and 0.4 part zinc stearate. The resulting molding composition was dried at 50° C. When cured under heat and pressure, molded articles of good appearance and excellent water resistance were obtained from the dried composition.

*Example 13*

Same formula as Example 11 except that 3 parts monochloroacetyl urea were used instead of phthalic anhydride. All of the components with the exception of the chloroacetyl urea were mixed and heated under reflux for 30 minutes. To the resulting partial condensation product was added the chloroacetyl urea, after which the mass was heated under reflux for 6 minutes to effect further intercondensation. The hot syrup was mixed with 64 parts alpha flock and 0.4 part zinc stearate to form a molding composition. The composition was dried at 50° C. and molded under heat and pressure, yielding well-cured molded articles of very light color. The molding composition showed excellent plastic flow.

*Example 14*

Same formula as Example 11 except that 3 parts sodium chloroacetate (a latent curing catalyst) were used instead of phthalic anhydride. All of the components with the exception of the sodium chloroacetate were mixed and heated under reflux for 30 minutes. The sodium chloroacetate was added to the resulting partial condensation product and the mass further refluxed for 7 minutes. The hot syrup was compounded with 64 parts alpha flock and 0.4 part zinc stearate to yield a molding composition. The compound was dried at 50° C. and thereafter molded at 130° C. under pressure. Well-cured molded articles of good appearance were obtained.

*Example 15*

|  | Parts |
|---|---|
| Urea | 54.0 |
| Aqueous ammonia (28%) | 15.0 |
| Aqueous formaldehyde (37%) | 161.0 |
| Itaconic diamide | 12.8 |
| Hydrochloric acid—35% (in 10 parts water) | 0.036 |

All of the components with the exception of the hydrochloric acid were mixed and heated under reflux for 30 minutes. A resin syrup comprising the intermediate condensation products of the above reactants was obtained. Upon cooling, the resinous syrup formed a homogeneous milky dispersion of exceptional stability. There was no tendency toward gelation or precipitation. To this syrup was added the above stated amount of hydrochloric acid and the mass was heated under reflux for 10 minutes to effect further intercondensation. The hot syrup was mixed with 65 parts alpha flock and 0.4 part zinc stearate to form a molding composition. The compound was dried at 50° C. and thereafter molded at 130° C. under pressure. Molded articles of good color and appearance were obtained.

*Example 16*

Same formula as Example 15 except that 0.12 part acetic acid in 1 part water was used instead of hydrochloric acid. The resulting syrup had essentially the same properties as the syrup of Example 15. To this syrup was added the above-stated amount of acetic acid and the mass refluxed for an additional 10 minutes to effect further reaction. The hot syrup was mixed with 65 parts alpha flock and 0.4 part zinc stearate to form a molding compound. This compound was dried at 50° C. It was shaped and hardened at 130° C. under pressure, yielding products somewhat similar in characteristics to the molded articles of Example 15.

*Example 17*

Same formula as Example 15 except that 1 part alpha or beta or alpha and beta halogenated amide of a secondary amine, specifically diethyl chloroacetamide, was used instead of hydrochloric acid. (Reference is made to my copending application Serial No. 288,033, filed Aug. 2, 1939, for illustrative examples of other halogenated amides of this class which may be used as latent curing catalysts in practicing the present invention.) The components were mixed and heated under reflux for 10 minutes. To the resulting partial condensation product was added the above-stated amount of diethyl chloroacetamide. The mass was again heated under reflux for 10 minutes to effect further intercondensation. The hot syrup was mixed with 65 parts alpha flock and 0.4 part zinc stearate to form a molding composition. The compound was dried at 50° C. and thereafter molded at 130° C. under pressure to form well-cured molded articles. This compound showed exceptionally good plastic flow during molding.

*Example 18*

|  | Parts |
|---|---|
| Urea | 54.0 |
| Hexamethylenetetramine | 1.4 |
| Aqueous formaldehyde (37%)—neutral | 161.0 |
| Itaconic diamide | 12.8 |

The above components were mixed and heated under reflux for 30 minutes. The resulting reaction product, even when cool, was a clear syrupy liquid. There was no precipitate. The syrup was compounded with 66 parts alpha flock and 0.4 part zinc stearate. The resulting molding composition was dried at 50° C. Articles formed under heat and pressure from this composition were of good appearance. The molded articles were well cured and good plastic flow during molding was indicated.

*Example 19*

|  | Parts |
|---|---|
| Urea | 54.0 |
| Aqueous formaldehyde (37%)—neutral | 161.0 |
| Itaconic diamide | 12.8 |

The components were mixed and refluxed for 30 minutes. The resulting clear, homogeneous, precipitate-free, hot resinous syrup was mixed with 70 parts alpha flock and 0.4 part zinc stearate to form a molding composition. The compound was dried at 50° C. and molded at 130° C. under pressure to form molded articles of good quality. The molding composition showed exceptionally good plastic flow and cured quickly and uniformly.

*Example 20*

| Syrup A: | Parts |
|---|---|
| Urea | 60.0 |
| Ammonia (28%) | 15.0 |
| Aqueous formaldehyde (37%) | 161.0 |

The above components were mixed and refluxed for 30 minutes.

| Syrup B: | Parts |
|---|---|
| Itaconic diamide | 58.0 |
| Aqueous formaldehyde (37%) | 90.0 |
| Hydrochloric acid—35% (in 10 parts water) | 0.16 |

The above components were mixed and heated under reflux for 30 minutes.

Syrups A and B were mixed and compounded with 91 parts alpha flock and 0.5 part zinc stearate. The resulting compound was heated to effect further condensation simultaneously with drying. Articles formed by molding the compound under pressure at 130° C. were hard, well cured and indicated good flow during molding.

Example 21

| | Parts |
|---|---|
| Urea | 27.0 |
| Aqueous ammonia (28%) | 3.8 |
| Aqueous formaldehyde (37%) | 80.8 |
| Itaconic diamide | 6.4 |
| Chloroacetamide | 0.66 |

All of the components with the exception of the chloroacetamide were mixed and heated under reflux for 30 minutes. After cooling the resulting resin syrup, the chloroacetamide dissolved in 5 parts water was added thereto. This syrup was used in producing laminated articles. Sheets of paper were dipped in the syrup and dried at 50° C. The resin content of the impregnated sheets was approximately 50%. Superimposed sheets were laminated at 130° C. under a pressure of approximately 1400 pounds per square inch. The laminated articles were of good appearance and free from imperfections. The resin bond between the sheets was well cured.

It will be understood, of course, by those skilled in the art that the present invention is not limited to the use of the specific components named in the above illustrative examples. Thus, instead of itaconic diamide, I may use any other amide of an unsaturated polycarboxylic acid containing a

grouping and in which the carboxyl groups are attached to different carbon atoms. Illustrative of such amides are:

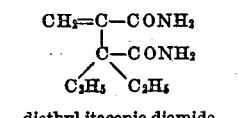

diethyl-itaconic diamide

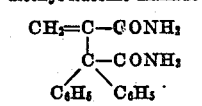

diphenyl-itaconic diamide

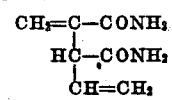

vinyl-itaconic diamide

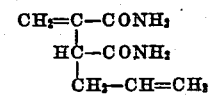

allyl-itaconic diamide

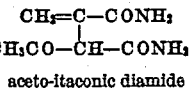

aceto-itaconic diamide

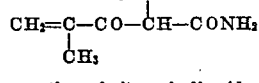

methacrylo-itaconic diamide

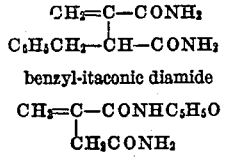

benzyl-itaconic diamide

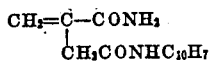

N-furfuryl itaconic diamide

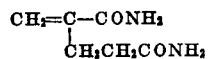

N'-naphthyl itaconic diamide

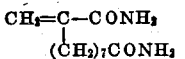

methylene-adipic diamide

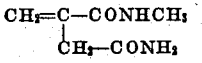

methylene-sebacic diamide

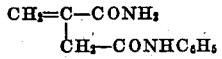

N-methyl itaconic diamide

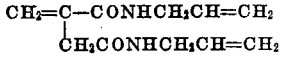

N'-phenyl itaconic diamide

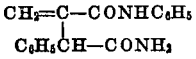

N,N'-diallyl itaconic diamide

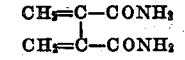

N-phenyl, phenyl-itaconic diamide

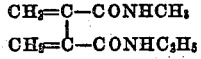

fulgenic amide

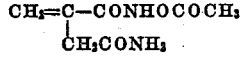

N-methyl, N'-ethyl fulgenic amide

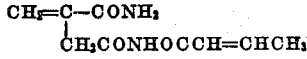

N-aceto itaconic diamide

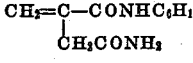

N'-crotonyl itaconic diamide

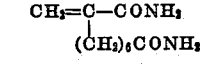

N-cyclohexyl itaconic diamide

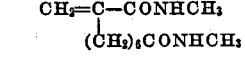

methylene-azelaic diamide

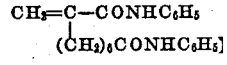

N,N'-dimethyl azelaic diamide $$CH_2=C-CONHC_6H_5$$
$$(CH_2)_6CONHC_6H_5]$$

N,N'-diphenyl azelaic diamide

In addition to formaldehyde, compounds engendering formaldehyde may be used, for example paraformaldehyde, hexamethylenetetramine, etc. Other aliphatic aldehydes also may be used, the particular aldehyde employed depending upon economic considerations and the particular properties desired in the end-product. For instance, in certain cases I may use acetaldehyde, propionaldehyde, butyraldehyde, acrolein, methacrolein, crotonaldehyde, etc., mixtures thereof, or mixtures of formaldehyde (or compounds engendering formaldehyde) with such aliphatic aldehydes.

Likewise, methylol-forming organic compounds other than urea and phenol may be used. Illustrative of such compounds are: monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; amides such as formamide, acetamide, stearamide, acrylic acid amides (acryloamides), benzamide, toluene sulfonamide, etc.; amines such as ethylene diamine, aniline, phenylene diamine, amino phenols, etc.; and mixtures thereof. Such organic compounds contain at least one hydrogen atom which, when reacted with an aliphatic aldehyde such as formaldehyde, is replaced by the substituent grouping —CH₂OH.

In carrying the present invention into effect I may use not only urea itself as the methylol-forming organic compound, but also related substances such as thiourea; derivatives of urea such as methyl urea, acetyl urea, benzoyl urea, phenyl thiourea, asymmetrical diethyl urea, allyl urea, 2-chloroallyl urea, ethylidene urea, methylol urea, methylene urea, etc.; or substances of the nature of urea, for instance guanidine, dicyandiamide, guanylurea, guanylthiourea, biguanidine, aminoguanidine, aminotriazole, creatine, creatinine, guanoline, ethylene pseudo-sulfocarbamide derivatives, sulfohydantoin, triazine derivatives, etc. The term "a urea" as used generally herein and in the appended claims is therefore intended to mean substances of the kind above mentioned.

Likewise, substances other than phenol itself may comprise the methylol-forming organic compound. For instance, I may use other reactive phenolic bodies such as ortho, meta and para cresols, ortho, meta and para chlorophenol, meta nitrophenol, p, p'-dihydroxy diphenyl, catechol, resorcinol, etc. The term "a phenol" as used generally herein and in the appended claims is therefore intended to mean not only phenol (C₆H₅OH) but also homologues and derivatives of phenol.

As shown in, for instance, Examples 1, 14 and 17, the resinous compositions of this invention which are initially heat-non-convertible may be rendered heat-convertible by incorporating therein a suitable direct (active) or latent curing catalyst. Also, as shown by Examples 12, 13 and 21, I may intercondense into the initial condensation products other components which impart self-curing characteristics to the resinous mass and which properly may be described as curing reactants as distinguished from the active (direct) and latent curing catalysts. Such components may be, for example:

(1) A halogenated amide selected from the class consisting of alpha halogenated amide, beta halogenated amide and alpha, beta halogenated amide, the amide grouping of the said amides being

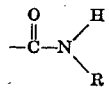

where R is hydrogen, or an alkyl, aryl, aralkyl, alkaryl, acyl, naphthyl, hydrocyclic or heterocyclic radical, or a nitro, halogeno, aceto, carbalkoxy or acetoxy derivative of the said radicals. An example of such a halogenated amide is chloroacetamide (monochloroacetamide). The use of this amide in producing resinous products of this invention is described under Examples 12 and 21. Reference is made to my copending application Serial No. 289,277, filed Aug. 9, 1939, now Patent No. 2,285,418, issued June 9, 1942, for illustrative examples of other halogenated amides of this class which may be used.

(2) An aldehyde-reactable halogenated acylated urea in which at least one halogen atom is attached to an alpha carbon atom, a beta carbon atom or alpha and beta carbon atoms. Example 13 describes the use of such a halogenated acylated urea, specifically mono-chloroacetyl urea, in producing self-curing resinous bodies, by which is meant heat-convertible resinous condensation products having the inherent characteristic of curing under heat or under heat and pressure to the insoluble infusible state without the addition of a curing accelerator or catalyst. Reference is made to my copending application Serial No. 289,273, filed Aug. 9, 1939, now Patent No. 2,281,559, issued May 5, 1942, for illustrative examples of other halogenated acylated ureas of this class which may be used.

(3) A halogenated nitrile of the class in which at least one halogen atom is attached to an alpha, beta or gamma carbon atom or to any two or all of such carbon atoms. An example of such a halogenated nitrile is chloroacetonitrile. Reference is made to my copending application Serial No. 289,274, filed Aug. 9, 1939, for illustrative examples of other halogenated nitriles of this class which may be used.

(4) A halogenated aldehyde in which at least one halogen atom is attached to an alpha carbon atom, a beta carbon atom, or alpha and beta carbon atoms, for example chloral hydrate. Reference is made to my copending application Serial No. 289,275, filed Aug. 9, 1939, now Patent No. 2,277,480, issued March 24, 1942, for illustrative examples of other halogenated aldehydes of this class which may be used.

(5) A halogenated ketone of the class of ketones in which at least one halogenated atom is attached to a carbon atom or atoms located alpha or beta to the keto group, for example chloroacetone. Reference is made to my copending application Serial No. 289,276, filed Aug. 9, 1939, for illustrative examples of other halogenated ketones of this class which may be used.

(6) An aldehyde-reactable nitrated urea, for example nitrourea and sodium nitrourea. Reference is made to the copending application of Gaetano F. D'Alelio and J. B. Holmes, Serial No. 289,281, filed Aug. 9, 1939, now Patent No. 2,263,289, issued November 18, 1941, for illustrative examples of other nitrated ureas of this class which may be used.

(7) An aldehyde-reactable basic amine salt, for example methylene diamine monohydrochloride. Reference is made to my copending application Serial No. 289,278, filed Aug. 9, 1939, for illustrative examples of other basic amine salts of this class which may be used.

(8) An aldehyde-reactable aminoamide salt, for example aminoacetamide hydrochloride. Reference is made to my copending application Serial No. 289,279, filed Aug. 9, 1939, for illustrative examples of other aminoamide salts of this class which may be used.

(9) An aminoalcohol salt, for example diethanolamine hydrochloride. Reference is made to my copending application Serial No. 289,280, filed Aug. 9, 1939, for illustrative examples of other aminoalcohol salts which may be used.

Although the reaction products of an aliphatic aldehyde and vinyl polyamides are valuable in themselves, they have even greater commercial utility when suitably modified. For example, when vinyl polyamides are intercondensed with a phenol and an aliphatic aldehyde, specifically phenol and formaldehyde, the introduction of the vinyl polyamide into the resin molecule imparts excellent light stability to the end-product. This is probably due to the presence of the grouping

in the polyamide. This light stability is truly an unexpected result, since unmodified phenol-aldehyde products have not been light-colored or, if initially so, have not been light-resistant.

Heretofore in applications involving solutions of aminoplasts, great difficulty has been experienced in obtaining syrups free from solid precipitates and of sufficient time stability. In order to obtain clear or uniform syrups it was necessary either to prevent precipitation by the addition of suitable emulsifying agents or solvents, or to remove the precipitates by mechanical means such as filtration. By practicing my invention these steps may be eliminated and manufacturing costs reduced, as is readily seen from a consideration of Example 19. As there shown, the resinous syrup obtained by reacting itaconic diamide, urea and formaldehyde is a clear, homogeneous, precipitate-free liquid mass. If the itaconic diamide be omitted from the formula, a precipitate forms immediately on refluxing the urea and formaldehyde.

In producing urea-resin type of molding compounds of adequate plastic flow, it has generally been the practice heretofore to incorporate a plasticizer, for example tricresyl phosphate, into the molding composition. Usually such plasticizers have been insoluble, or substantially so, in the resin syrup. Hence great care was required in obtaining a uniform distribution of the plasticizer through the resinous mass. In many cases a mutual solvent was necessary to effect sufficient homogeneity, thereby increasing production costs. Molding compositions made from urea-aliphatic aldehyde-vinyl polyamide resinous condensation products ordinarily require no added plasticizer, the advantages of which are obvious.

If desired, the fundamental resins of this invention may be modified by introducing other bodies before, during or after condensation between the primary components. These modifying substances may or may not have resinous characteristics, for example partially hydrolyzed wood products, lignin, proteins, protein-aldehyde condensation products, phenol-aldehyde condensation products, aniline-aldehyde condensation products, furfural condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides.

Dyes, pigments and opacifiers (e. g., barium sulfate, zinc sulfide, titanium compounds such as the oxides, flaked aluminum, copper and the like) may be incorporated into the compositions of this invention to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compounds. The choice of the filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or short fiber length, powdered or flake mica, wood chips, short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially-dehydrated resins may be compounded with the above addition agents in accordance with procedures well-known to those skilled in the art. The wet composition may be dried in the usual manner either at normal (room) temperature or at elevated temperatures in a preheated stream of air or under the influence of reflected heat energy. The dried compound may be densified through the usual processes of working in a Banbury mixer, or by rolling, pelleting or other means, followed by grinding and screening to the desired particle size. The molding compositions may be molded at elevated temperatures, more particularly between 100° and 170° C., preferably between 120° and 150° C., and at suitable pressures. The molding pressures generally range between about 1000 and about 4000 pounds per square inch, more particularly from about 2000 to 3000 pounds per square inch.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric or other form. It will be understood, of course, that optimum resistance to water, fire, solvents, etc., is obtained only when the applied coating or sizing is converted to the insoluble infusible (cured) state. The cellulosic or other fibrous materials to be treated may be surface coated or both coated and impregnated by any suitable means, for example by spraying with, or immersing in, a solution of the treating agent and thereafter removing the solvent.

The modified or unmodified products of this invention have a wide variety of other uses, for instance in making buttons, clock cases, radio cabinets, dishes and other household utensils, decorative novelties and various other cast, molded and laminated articles of manufacture. They also may be used in the manufacture of arc-extinguishing tubes, as bonding agents for mica flakes in the production of laminated mica articles, in producing wire or baking enamels, as impregnants for electrical coils and other electrical devices, and for other purposes.

What I claim as new and desire to secure by Letters Patent of the United States is:

1. A composition of matter comprising a condensation product of a mixture comprising an aliphatic aldehyde and an amide of an unsaturated polycarboxylic acid containing a

grouping and in which the carboxyl groups are attached to different carbon atoms.

2. A composition of matter comprising a resinous product of reaction of a plurality of reactants including an aliphatic aldehyde, an amide of an unsaturated polycarboxylic acid containing a

grouping and in which the carboxyl groups are attached to different carbon atoms, and at least one other aliphatic-aldehyde-reactable organic compound capable of forming a methylol derivate as an intermediate during the resin formation.

3. A resinous composition comprising the product of reaction of a plurality of reactants including an aliphatic aldehyde, a urea, and an amide of an unsaturated polycarboxylic acid containing a

grouping and in which the carboxyl groups are attached to different carbon atoms.

4. A resinous composition comprising an alcohol-modified resinous condensation product of formaldehyde, a urea, and an amide of an unsaturated polycarboxylic acid containing a

grouping and in which the carboxyl groups are attached to different carbon atoms.

5. A resinous composition comprising the product of reaction of a mixture comprising an aliphatic aldehyde, a phenol, and an amide of an unsaturated polycarboxylic acid containing a

grouping and in which the carboxyl groups are attached to different carbon atoms.

6. A composition of matter comprising a resinous condensation product of a mixture comprising itaconic diamide and formaldehyde.

7. A heat-convertible resinous composition comprising a soluble fusible resinous reaction product of a plurality of reactants including formaldehyde, itaconic diamide and at least one other aliphatic-aldehyde-reactable organic compound capable of forming a methylol derivative as an intermediate during the resin formation.

8. A molding composition comprising a heat-convertible resinous product of reaction of a plurality of reactants including a phenol, itaconic diamide and formaldehyde.

9. A molding composition comprising a heat-convertible resinous product of reaction of a mixture comprising urea, itaconic diamide and formaldehyde.

10. A product comprising the cured resinous composition of claim 7.

11. An article of manufacture comprising the heat- and pressure-hardened molding composition of claim 8.

12. An article of manufacture comprising superimposed sheets of fibrous material bonded together with the insoluble and infusible resinous composition of claim 3.

13. The method of producing a resinous composition which comprises reacting to resin formation a mixture containing an aliphatic aldehyde and an amide of an unsaturated polycarboxylic acid containing a

grouping and in which the carboxyl groups are attached to different carbon atoms.

14. A composition of matter comprising (1) a heat-convertible resinous product of reaction of a mixture comprising an aliphatic aldehyde and an amide of an unsaturated polycarboxylic acid containing a

grouping and in which the carboxyl groups are attached to different carbon atoms and (2) a curing catalyst.

15. A composition of matter comprising the product of reaction of a mixture comprising (1) an aliphatic aldehyde, (2) an amide of an unsaturated polycarboxylic acid containing a

grouping and in which the carboxylic groups are attached to different carbon atoms and (3) a curing reactant.

16. A composition of matter comprising the product of reaction of a plurality of reactants including (1) formaldehyde, (2) a urea, (3) an amide of an unsaturated polycarboxylic acid containing a

grouping and in which the carboxylic groups are attached to different carbon atoms and (4) a curing reactant.

GAETANO F. D'ALELIO.